US012620017B2

(12) United States Patent
Durand et al.

(10) Patent No.: US 12,620,017 B2
(45) Date of Patent: May 5, 2026

(54) SYSTEMS AND METHODS FOR FORMULATING CUSTOM COSMETIC AND PERSONAL CARE PRODUCTS FOR AN INDIVIDUAL

(71) Applicant: PROSE BEAUTY, INC., Brooklyn, NY (US)

(72) Inventors: Morgan Durand, Saint-Quen (FR); Marie Mignon, Paris (FR); Arnaud Plas, Brooklyn, NY (US); Paul Michaux, Livingston Manor, NY (US); Nicolas Mussat, Paris (FR)

(73) Assignee: PROSE BEAUTY, INC., Brooklyn, NY (US)

( * ) Notice: Subject to any disclaimer, the term of this patent is extended or adjusted under 35 U.S.C. 154(b) by 42 days.

(21) Appl. No.: 18/773,422

(22) Filed: Jul. 15, 2024

(65) Prior Publication Data

US 2026/0017704 A1     Jan. 15, 2026

(51) Int. Cl.
| | |
|---|---|
| *G06Q 30/00* | (2023.01) |
| *G06N 20/00* | (2019.01) |
| *G06Q 30/0282* | (2023.01) |
| *G06Q 30/0601* | (2023.01) |

(52) U.S. Cl.
CPC ......... *G06Q 30/0631* (2013.01); *G06N 20/00* (2019.01); *G06Q 30/0282* (2013.01); *G06Q 30/0643* (2013.01)

(58) Field of Classification Search
CPC ................................................ G06Q 30/0631
See application file for complete search history.

(56) References Cited

U.S. PATENT DOCUMENTS

| | | | |
|---|---|---|---|
| 12,277,707 B2 * | 4/2025 | Tufail | G16H 20/17 |
| 12,350,635 B2 * | 7/2025 | Lee | B01F 35/2205 |
| 2019/0347296 A1 * | 11/2019 | Parkkinen | G06F 16/90324 |

(Continued)

OTHER PUBLICATIONS

Mohammed, Fathey, et al. "Beauty Formula DermoScan: user-centric skincare products' ingredient analysis platform." 2024 4th International Conference on Emerging Smart Technologies and Applications (eSmarTA). IEEE, 2024.*

*Primary Examiner* — Kathleen Palavecino
(74) *Attorney, Agent, or Firm* — H&I PARTNERS; Chai Im; C. Andrew Im

(57) ABSTRACT

A computerized method of formulating custom cosmetic and personal care products for an individual with regards to a benefits list. The method collects customer data from the individual using a scoring function and customer consolidated data. The method generates benefits prioritization functions from the customer consolidated data using benefits priority triggers, identifies accessible routines using a routines library, and selects a recommended routine from the accessible routines. For each cosmetic and personal care product of the recommended routine, the method identifies the accessible formulas using formulation constraints and components library, generates benefit performance indexes of each accessible formula using performance contribution scores, selects an optimal formula from accessible formulas using benefit prioritization function and benefit performance indexes, and produces a custom cosmetic and personal care product according to the optimal formula. The method preferably includes a feedback loop to further improve the formulation.

13 Claims, 8 Drawing Sheets

(56)        References Cited

U.S. PATENT DOCUMENTS

| | | | | |
|---|---|---|---|---|
| 2020/0038824 | A1* | 2/2020 | Charraud | B01F 35/2209 |
| 2023/0018947 | A1* | 1/2023 | Taylor | A61M 35/00 |
| 2023/0410179 | A1* | 12/2023 | Yuan | G16H 50/70 |

* cited by examiner

Customer Scores — 3

$$\begin{bmatrix} scoring_1 \\ scoring_2 \\ \vdots \\ scoring_n \end{bmatrix}$$

Scoring Matrix — 20

Scores

Coefficient associated with each data point (= how these data points contributes each score - can be positive, negative or neutral)

Expert inputs ex. :
Damage Score,
Dryness Score,
Sebum Score,
Sensitivity Score,
Stressors Score
...

$$\begin{bmatrix} a_{11} & a_{12} & \cdots & a_{1n} \\ a_{21} & a_{22} & \cdots & a_{2n} \\ \vdots & \vdots & \ddots & \vdots \\ a_{m1} & a_{m2} & \cdots & a_{mn} \end{bmatrix}$$

Score calculation — 102

$$\begin{bmatrix} a_{11} & a_{12} & \cdots & a_{1n} \\ a_{21} & a_{22} & \cdots & a_{2n} \\ \vdots & \vdots & \ddots & \vdots \\ a_{m1} & a_{m2} & \cdots & a_{mn} \end{bmatrix} \times \begin{bmatrix} b_1 \\ b_2 \\ \vdots \\ b_n \end{bmatrix}$$

Customer data points vector — 1

$$[b_1 \ b_2 \ \cdots \ b_n]$$

Fig. 3A

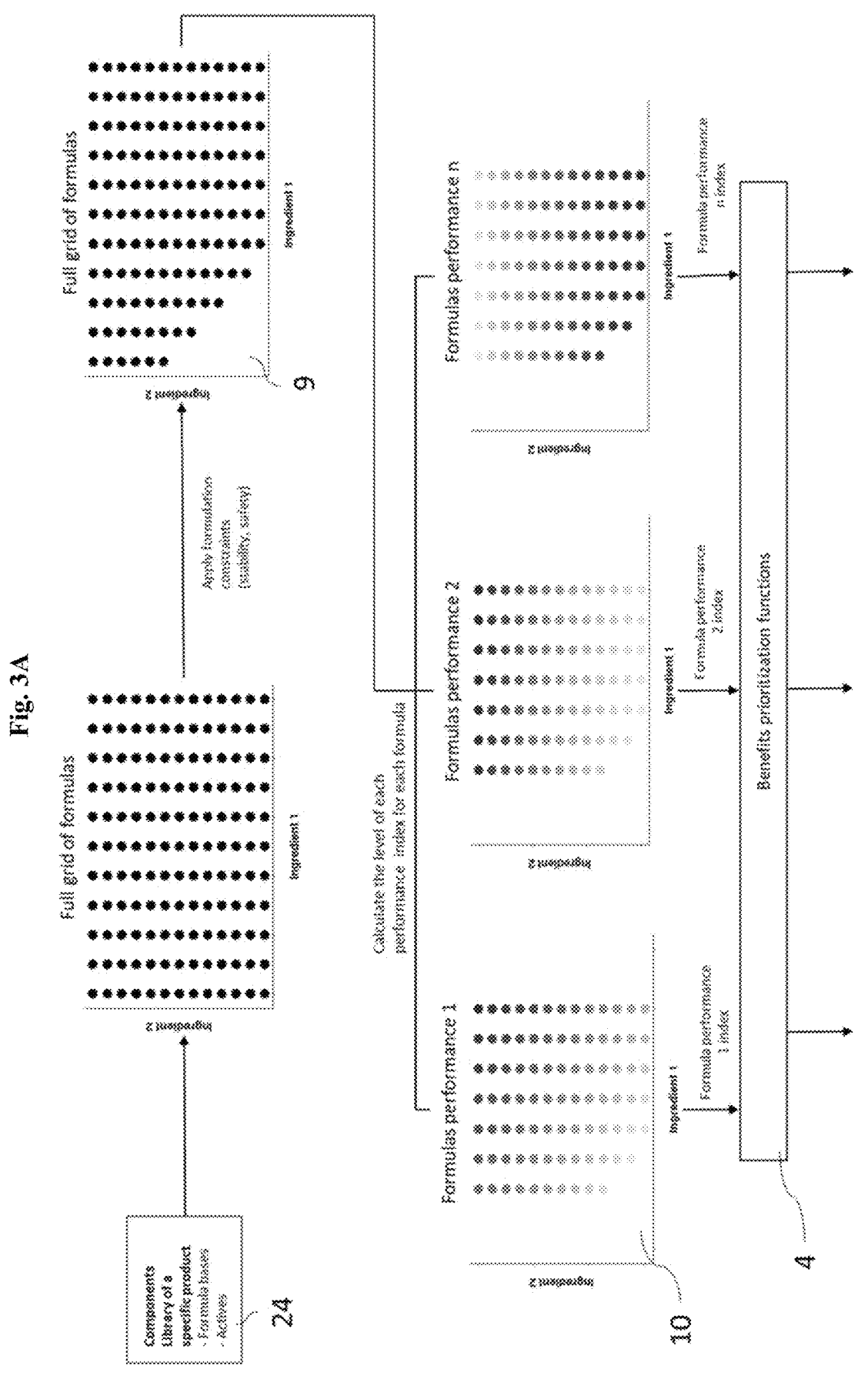

Full grid of formulas

Full grid of formulas

Apply formulation constraints (stability, safety)

Components library of a specific product
. Formula bases
. Actives

24

9

Ingredient 1

Ingredient 2

Calculate the level of each performance index for each formula

Formulas performance 1

Formulas performance 2

Formulas performance n

Formula performance 1 index

Formula performance 2 index

Formula performance n index

Benefits prioritization functions

Ingredient 1

Ingredient 2

10

4

SYSTEMS AND METHODS FOR FORMULATING CUSTOM COSMETIC AND PERSONAL CARE PRODUCTS FOR AN INDIVIDUAL

TECHNICAL FIELD

The present invention belongs to the field of systems and methods for formulating cosmetic and personal care products. In particular, the present invention concerns a method and a system for formulating custom cosmetic and personal care products and recommending a cosmetic and personal care routine.

BACKGROUND OF THE INVENTION

Cosmetic and personal care products, encompassing skincare and hair care, are typically mass-produced and categorized based on singular attributes such as hair texture and/or singular benefits like color protection. This segmentation strategy aims to streamline product lines and optimize production costs, but it falls short in meeting the diverse and intricate needs of each individual consumer. As a result, the performance of these products may not be optimal for every user, particularly for those having multiple needs, concerns and preferences and lead to necessary trade-offs. This underscores the necessity for personalized products tailored to meet the unique needs and preferences of each specific individual.

Currently, several solutions are described to customize cosmetic and personal care products for individuals. Most of these solutions fall into a first category which consists of selecting from a list of mass produced products the most relevant off-the-shelf-products to fit a specific individual needs. This category greatly limits the efficacy of selected products because of the limited list from which products are selected and because it fails to fully accommodate the diverse and nuanced preferences of individual users. The efficacy of a cosmetic and personal care product is its capability to produce the desired effects on a specific user.

For example, one solution relies on defining a set of ingredients capable of addressing the needs of a specific user and then selecting from a set of products the ones containing part or all ingredients of the defined set of ingredients. This solution falls into the first category hence provides limited efficacy of the recommended products with regards to the user specificities.

A second category, addressing this difficulty, consists in formulating a product to custom fit its user specificities.

A solution corresponding to this second category relies on the use of instrumental devices by the user to get skin and/or hair measurements. This approach represents a relatively accurate way of evaluating the user skin and/or hair health and needs but is limiting the user access to this solution as the use of instrumental devices cannot be easily implemented at the user's home.

Another approach is to rely on self-declared data from the user, it greatly increases the accessibility of the solution but suffers from a lower reliability of the information used as input for the formulation.

One key challenge for solutions in this second category is to optimize the custom product formulation with regards to all the different specificities of an individual user.

SUMMARY AND OBJECT OF THE INVENTION

The present invention has for objective to remedy all or a portion of the limitations of the solutions of prior art, in particular those mentioned hereinabove, by proposing a method and a system for formulating custom cosmetic and personal care products and recommending a cosmetic and personal care routine.

To this effect, and according to a first aspect, the invention relates to a computerized method of formulating custom cosmetic and personal care products for an individual with regards to a benefits list, using a processor-based computing system. The method comprises collecting from the individual, customer's data, generating customer's consolidated data from the customer's data using a scoring function. The customer's data includes stated preferences, stated needs, accuracy promoters and at least one of a skin description and a hair description. The consolidated customer's data comprises customer's scores, needs and preferences and a customer's segment. The method also comprises generating, for each benefit of the benefits list, first benefit prioritization functions from the customer's scores, needs and preferences using benefits priority triggers, identifying accessible routines from the customer's segment using a routines library, and selecting a first recommended routine from accessible routines using the customer's scores, needs and preferences. The recommended routine includes at least one first cosmetic and personal care product. For each first cosmetic and personal care product of the first recommended routine, the method includes identifying accessible formulas from the customer's scores, needs and preferences using formulation constraints and a components library, generating, for each benefit of the benefits list, a benefit performance index of each accessible formula using performance contribution scores, selecting a first optimal formula from accessible formulas using first benefit prioritization functions and benefit performance indexes, and producing a first custom cosmetic and personal care product according to the first optimal formula.

The accuracy promoters can be, for example, redundant or correlated questions which allow to evaluate the reliability of elements composing the user skin and hair descriptions and the user stated needs and preferences.

The scoring function can be, for example, a linear model based on a matrix attributing predetermined values to elements of the skin and hair descriptions in order to produce scores representative of the skin current state and of the hair current state.

The customer's segment can be, for example, a customer's category representative of the individual habits with cosmetic and personal care products and routines.

The priority triggers can be, for example, predetermined conditions for specific shape and scale parameters to be applied to generate corresponding benefit prioritization functions. If the customer's scores, needs and preferences meet the predetermined conditions, corresponding shape and scale parameters are used to generate benefit prioritization functions.

The routines library can be, for example, an exhaustive list of possible cosmetic and personal care routines, for each possible routine, accessibility conditions are predefined.

A cosmetic and personal care routine can be, for example, a list of cosmetic and personal care products and custom instructions of use for each product.

The components library can be, for example, a list of components or ingredients or blend of ingredients of cosmetic and personal care products.

The formulation constraints are the constraints applied to cosmetic and personal care products possible components and corresponding proportion of said components. It defines the boundary of components possible variations within which a cosmetic and personal care product comprising said components remains feasible and accessible.

The performance contribution scores can be, for example, matrices of level of performance with regards to a benefit depending on formulas.

The formula of a product is the components list and concentrations in the product.

The benefit performance indexes are for each benefit the level of performance reached by a given formula.

The benefits list is a list of potentially requisite benefits to the individual skin or hair condition. A benefit can be for example, curl definition, sebum control, flakes control, skin soothing, scalp soothing, hair shine, hair volume, hair smoothing, hair color protection, hair nutrition, heat protection, scalp detox, damage repair, redness reduction, hydration, blue-light protection, exfoliation, aging prevention, glow improvement and blemishes reduction.

Hair and skin descriptions can be, for example, a list of defining features like skin dryness level or hair color.

Thus, the invention enables recommending a cosmetic and personal care routine comprising cosmetic and personal care products whose formulation is optimized to offer the best efficacy to a specific individual. Both the routine and the products are customized without the need to use dedicated instruments or equipment. The low reliability of user inputs inherent to self-declared inputs is overcome by generating customer's consolidated data from customer's data comprising accuracy promoters.

In particular embodiments, the invention may further comprise one or more of the following features, taken alone or in any technically possible combination.

According to other aspects of the present disclosure, the method may include collecting customer's feedback from the individual. Customer's feedback includes an evaluation of the first recommended routine and an evaluation of each first custom cosmetic and personal care product. The method may include generating, for each benefit of the benefits list, using benefits priority triggers, a second benefit prioritization function from the customer's scores, needs and preferences and the evaluation of each first custom cosmetic and personal care product and selecting a second recommended routine from accessible routines using the customer's scores, needs and preferences and the evaluation of the first recommended routine. The second recommended routine includes at least one second cosmetic and personal care products. For each second cosmetic and personal care product of the second recommended routine, the method includes identifying accessible formulas from the customer's scores, needs and preferences, generating, for each benefit of the benefits list, a benefit performance index of each accessible formula using performance contribution scores, selecting a second optimal formula from accessible formulas using second benefit prioritization functions and benefit performance indexes, and producing a second custom cosmetic and personal care product according to the second optimal formula.

Thus, the invention further improves the efficacy of recommended cosmetic and personal care routine and products by using customer's feedback. These features of the invention also allow for multiple iterations of custom cosmetic and personal care product formulation using customer's feedback, each iteration improving the efficacy of the custom cosmetic and personal care products formulated.

According to another aspect of the present disclosure, the customer's data may also comprise exposome data and the customer's scores, needs and preferences take into account the exposome data.

The exposome data is representative of the environmental exposures encountered by the individual. The exposome data may comprise, for example, UV exposure, humidity level and pollution level.

Using exposome data allows the invention to take into account the impact of the environment of the individual on the individual's skin and hair to select an adequate formula for each product. The exposome data may influence benefit prioritization functions generation and/or accessible formulas identification through the customer's scores, needs and preferences.

According to other aspects of the present disclosure, the customer's data may also comprise at least one of a face picture of the individual and a scalp picture of the individual. The method further includes determining, using a machine learning algorithm, from the at least one of a face picture and a scalp picture, at least one of skin metrics and hair metrics, and the customer's scores, needs and preferences take into account the at least one of skin metrics and hair metrics.

Using at least one of a face picture and a scalp picture allows to further consolidate the customer's data with other data entry points and may serve as accuracy promoters. Thus, it improves the recommended routine and products efficacy.

According to yet another aspect of the present disclosure, the first benefit prioritization functions may be discontinuous functions of Derringer and Suich.

According to other aspects of the present disclosure, the first benefit prioritization functions and the second benefit prioritization functions may be discontinuous functions of Derringer and Suich.

Discontinuous functions of Derringer and Suich are particularly useful to represent the desirability of a level of performance for a given benefit.

According to another aspect of the present disclosure, the step of selecting a first recommended routine may comprise validating or editing a core routine by the individual and recommending upsell products by the processor-based computing device.

Sub steps of validating or editing a core routine and recommending upsell products allows the individual to further customize the cosmetic and personal care routine.

According to another aspect of the present disclosure, the steps of selecting a first and a second recommended routine comprise validating or editing a core routine by the individual and recommending upsell products by the computing device.

According to other aspects of the present disclosure, the performance contribution scores are predetermined using a machine learning model trained on performances instrumentally measured, performances evaluated via a sensory experts panel, or evaluation of first custom cosmetic and personal care products comprised in customer's feedback.

According to another aspect of the present disclosure, a computing system for formulating custom cosmetic and personal care products for an individual with regards to a benefits list includes a computing device configured to receive customer's data from the individual. The customer's data includes stated preferences, stated needs, accuracy promoters and at least one of a skin description and a hair description. The computing device is also configured to generate customer's consolidated data from the customer's data using a scoring function. The customer's consolidated data comprises customer's scores, needs and preferences and a customer's segment. The computing device is also configured to generate, for each benefit in the benefits list, a first benefit prioritization function from the customer's scores, needs and preferences, identify accessible routines from the customer's segment using a routines library, select a first recommended routine from accessible routines using the customer's scores, needs and preferences, identify accessible formulas from the customer's scores, needs and preferences, generate, for each benefit in the benefits list, a benefit performance index of each accessible formula using performance contribution scores, select a first optimal formula from accessible formulas using first benefit prioritization functions and benefit performance indexes, and produce a first custom cosmetic and personal care product according to the first optimal formula.

Thus, the computing system of the present invention can execute the method for formulating custom cosmetic and personal care products, optimizing the efficacy of custom cosmetic and personal care products associated to the recommended cosmetic and personal care routine.

According to other aspects of the present invention, the computing device may be further configured to collect customer's feedback from the individual. The customer's feedback comprises an evaluation of the first recommended routine and an evaluation of a plurality of first custom cosmetic and personal care products. The computing device is further configured to generate, for each benefit of the benefits list, a second benefit prioritization function from the customer's scores, needs and preferences and the evaluation of each first cosmetic and personal care product using benefits priority triggers, select a second recommended routine from accessible routines using the customer's scores, needs and preferences and the evaluation of the first recommended routine, identify accessible formulas from the customer's scores, needs and preferences, generate, for each benefit of the benefits list, a benefit performance index of each accessible formula using performance contribution scores, select a second optimal formula from accessible formulas using second benefit prioritization functions and benefit performance indexes, and produce a second custom cosmetic and personal care product according to the second optimal formula.

According to another aspect of the present disclosure, the computing system may further include an individual's processor-based personal device in communication with the computing device and wherein the individual's processor-based personal device is configured to collect customer's data from the individual and send the customer's data to the computing device.

According to other aspects of the present disclosure, the computing system may further comprise a machine learning module configured to generate a performance machine learning model using parts or all of a dataset comprising performances instrumentally measured, performances evaluated via a sensory experts panel and evaluation of first custom cosmetic and personal care products comprised in customer's feedback. The performance machine learning model is configured to produce performance contribution scores.

BRIEF DESCRIPTION OF THE FIGURES

The invention will be better understood when reading the following description, given as a non-limiting example, and made with reference to the figures which show:

FIG. 1 illustrates a flowchart of a computerized method for formulating custom cosmetic and personal care products, according ta-o aspects of the present disclosure.

FIG. 2 depicts a diagram demonstrating the generation of customer's consolidated data according to aspects of the present disclosure.

FIGS. 3A-B present a flowchart outlining the process of formulating a custom cosmetic and personal care product, highlighting the role of benefit prioritization functions, according to aspects of the present disclosure.

In these figures, identical references from one figure to another refer to identical or similar elements. For reasons of clarity, the elements shown are not necessarily of the same scale, unless otherwise stated.

DETAILED DESCRIPTION OF EMBODIMENTS

Figure 3B:
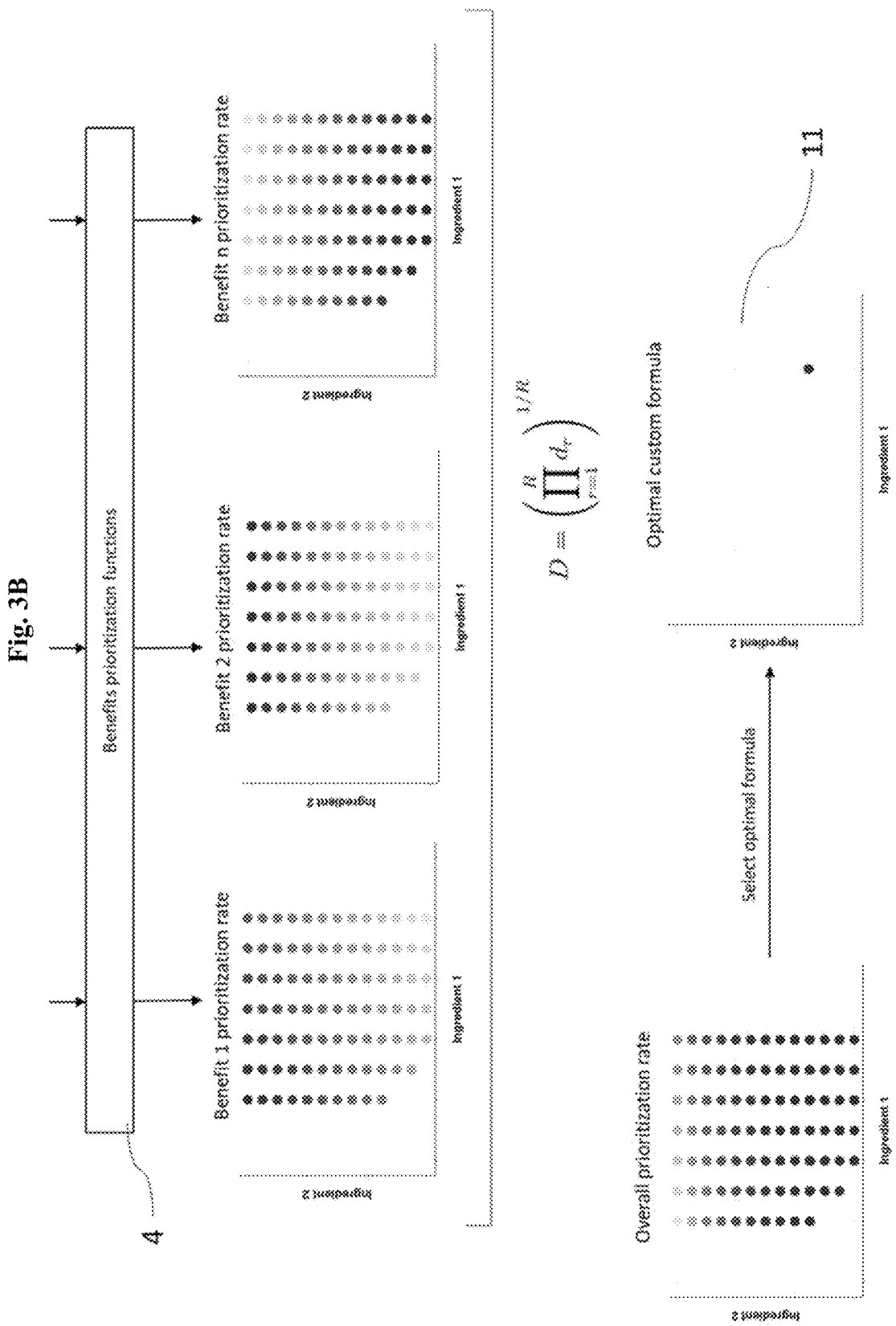

The following description sets forth exemplary aspects of the present invention. It should be recognized, however, that such a description is not intended as a limitation on the scope of the present invention. Rather, the description also encompasses combinations and modifications to those exemplary aspects described herein.

The present invention relates to systems and methods for formulating custom cosmetic and personal care products. More specifically, the present invention pertains to a computerized method of formulating cosmetic and personal care products for an individual with regards to a benefits list, based on a variety of individual-specific data inputs. These inputs may include, but are not limited to, skin and hair descriptions, lifestyle preferences, environmental data, and feedback on previous products. The system utilizes a scoring function, for example, a linear model based on a scoring matrix, to consolidate these data inputs, generating a comprehensive customer profile that includes customer's scores, needs, preferences, and identified customer's segment.

The system generates benefit prioritization functions based on the customer's scores, needs and preferences using benefits priority triggers. These functions are used to rate cosmetic care products with regards to each benefit of the benefits list. The system uses the customer's segment and a routines library to identify accessible routines and then select a recommended routine from accessible routines using the customer's scores, needs and preferences. The recommended routine comprises products and custom instructions of use. For each product in the recommended routine, the system identifies accessible formulas, generates, for each formula with regards to each benefit in the benefits list, benefit performance index using performance contribution scores, and selects an optimized formula using benefits prioritization functions and benefit performance indexes. This process allows for the creation of custom cosmetic and personal care products that are tailored to the specific needs and preferences of the individual.

The list of benefit comprises, for example, curl definition, sebum control, flakes control, skin soothing, scalp soothing, hair shine, hair volume, hair smoothing, hair color protection, hair nutrition, heat protection, scalp detox, damage repair, redness reduction, hydration, blue-light protection, exfoliation, aging prevention, glow improvement and blemishes reduction. In other aspects, the system may collect, from the individual, customer's feedback on the recommended routine and the products therein. This feedback is used to generate updated benefit prioritization functions, which in turn are used to select optimized formulas for the next order. This iterative process allows for continuous optimization of the custom cosmetic and personal care products, enhancing their efficacy and user satisfaction over time.

In other aspects, the system may collect, from the individual, updated customer's data. The updated customer's data is then consolidated and used to select updated formulas for the next order of custom cosmetic and personal care products. The updated customer's data may comprise updated exposome data.

In yet other aspects, the system may utilize machine learning models to predict the performance contribution scores used for benefit performance indexes generation of each accessible formula. These models can be trained on a variety of data, including instrumentally measured performances, evaluations from a sensory experts panel, or customer's feedback on previous products. This allows for a more accurate and robust prediction of product performances, further enhancing the personalization and efficacy of the custom cosmetic and personal care products.

In summary, the present disclosure provides a comprehensive and dynamic system for personalizing cosmetic and personal care products. By leveraging a variety of individual-specific data inputs and advanced computational methods, the system is configured to formulate and continuously optimize cosmetic and personal care products that are tailored to the specific needs and preferences of the individual, user of the system. This results in enhanced product efficacy and individual satisfaction, addressing a long-standing challenge in the field of cosmetic and personal care products.

Figure 1:
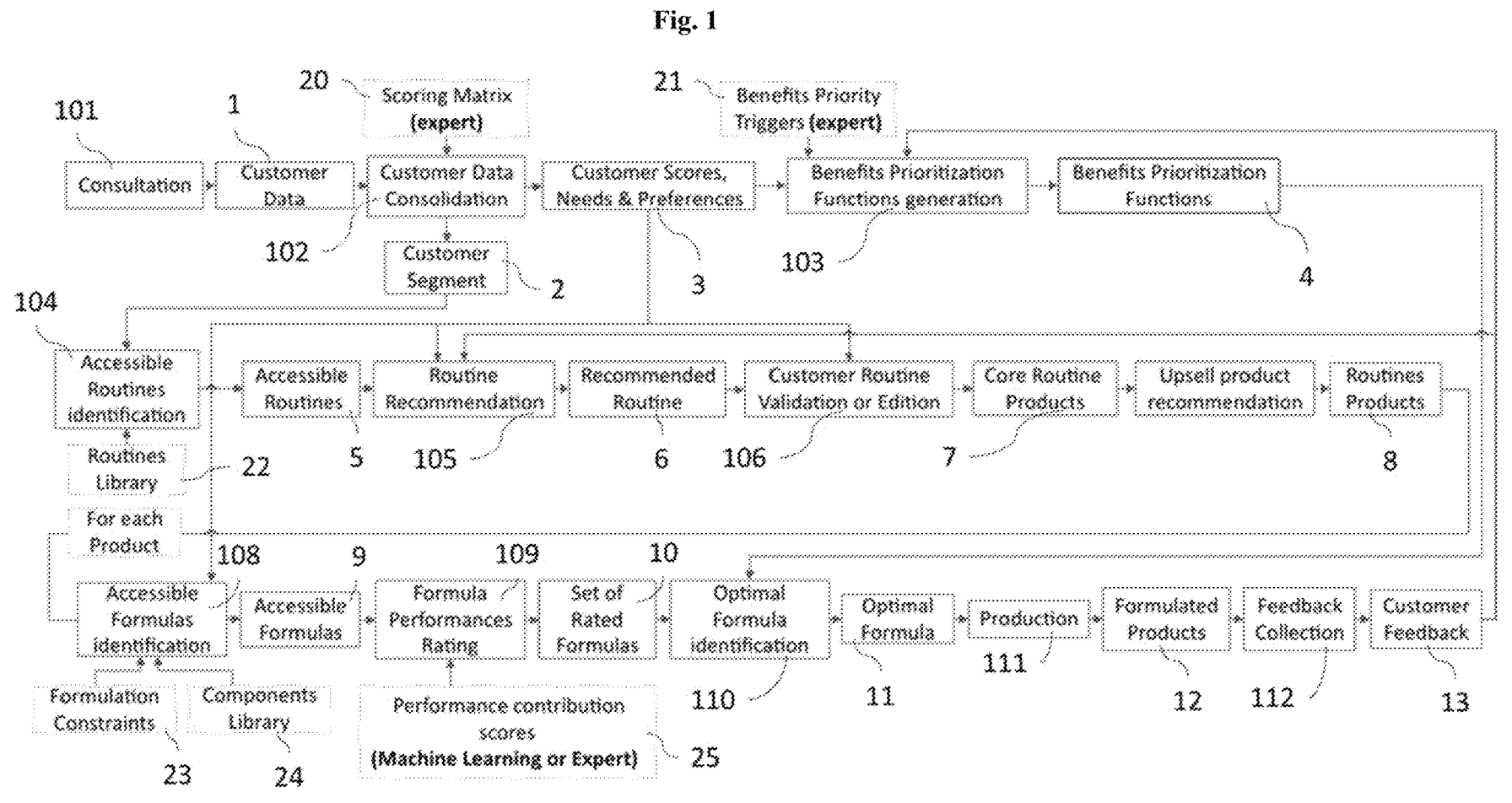

Referring to FIG. 1, a flowchart illustrates a computerized method for formulating custom cosmetic and personal care products. The method begins with collecting 101 customer's data 1 from the individual. This data includes at least one of a skin description and a hair description, stated preferences, stated needs, and accuracy promoters. In some cases, the customer's data may also include exposome data, which refers to environmental exposures encountered by the individual. This data can provide valuable insights into the individual's lifestyle and environmental factors that may impact their skin and hair health. In some aspects, the customer's data may also include a face and/or scalp picture of the individual, from which skin metrics and/or hair metrics are determined using a machine learning algorithm. These metrics can provide additional information about the individual's skin and hair condition and can be considered in the customer's scores, needs and preferences.

The collected customer's data 1 is then used for generating 102 customer's consolidated data. This process involves a scoring matrix 20, which is used to generate a customer's segment 2 and customer's scores, needs preferences 3. The scoring matrix 20 can be a mathematical or computational model that assigns scores to different aspects of the customer's data, such as skin type, hair type, lifestyle factors, and environmental factors. The resulting customer's segment 2 and customer's scores, needs and preferences 3 provide a comprehensive profile of the individual, which can be used to personalize the formulation of cosmetic and personal care products.

Next, the method involves generating 103 benefit prioritization functions 4. This process utilizes benefits priority triggers 21 to produce benefit prioritization functions 4. These functions can be discontinuous functions of Derringer and Suich, which are mathematical functions that can be used to prioritize different benefits based on the customer's scores, needs and preferences. The benefit prioritization functions 4 provide a way to prioritize the desired benefits of the cosmetic and personal care products, which can guide the formulation process.

The method then involves identifying accessible routines 104. This process uses routines library 22 to determine accessible routines 5. The routines library 22 can be a database or repository of pre-defined routines, which can be selected based on customer segment 2. The accessible routines 5 represent the possible routines that can be recommended to the individuals based on their segment.

The method then involves selecting a recommended routine 105. This process uses the customer's scores, needs and preferences 3 to select a recommended routine from the accessible routines 5. The recommended routine 6 comprises cosmetic and personal products 8. In some cases, the step of selecting a recommended routine may include the sub-step of validating or editing a core routine by the individual and recommending upsell products by the computing device.

For each product 8 of the recommended routine 6, the method involves identifying 108 accessible formulas 9. This process uses the customer's scores, needs and preferences as well as formulation constraints 23 and a components library 24 to find accessible formulas 9. The formulation constraints 23 can include various factors that limit the possible formulas, such as safety constraints, regulation constraints and product quality and stability considerations. The components library 24 can be a database or repository of available components or ingredients or blend of ingredients that can be used in the formulation of the custom cosmetic and personal care products.

The method then involves generating benefit performance indexes 109. This process involves rating each accessible formula using performance contribution scores 25.

The performance contribution scores 25 can be predetermined by experts during live testing campaigns using performances instrumentally measured or performances evaluated via a sensory experts panel. The performance contribution scores 25 can also be predetermined using a machine learning model trained on performances instrumentally measured, performances evaluated via a sensory experts panel, or evaluation of custom cosmetic and personal care products comprised in customer's feedback. The performance indexes 25 provide a way to assess the performance of each accessible formula in delivering the desired benefits.

The method then involves selecting a first optimal formula 110. This process uses the benefit performance indexes and the first benefit prioritization functions 4 to select the first optimal formula from the accessible formulas 9. The first optimal formula represents the formula that provides the optimum balance of benefits based on the customer's scores, needs and preferences. A non-limiting example of selection 110 is to apply for each benefit the corresponding benefit prioritization function to the corresponding benefit performance index to obtain a desirability level for each benefit and calculate the geometric mean desirability level across all benefits for each accessible formula. The accessible formula obtaining the highest mean desirability level is then selected as the optimal formula.

Finally, the method involves producing 111 custom cosmetic and personal care product 12 according to the first optimal formula 11.

In some aspects, the method may also involve collecting 112 customer feedback 13 from the individual. Customer feedback 13 includes an evaluation of the first recommended routine and of each first custom cosmetic and personal care product. Customer feedback 13 provides valuable insights into the individual's satisfaction with the custom cosmetic and personal care products, and can be used to further refine the routine recommendation process and the benefit prioritization functions. Customer feedback 13 are used to generate second benefit prioritization functions, select a second recommended routine, identify accessible formulas for each second cosmetic and personal care product of the second recommended routine, generate benefit performance indexes of each accessible formula using performance contribution scores, and select a second optimal formula from accessible formulas. This iterative process allows for continuous optimization of the custom cosmetic and personal care products based on the customer's feedback, leading to enhanced product efficacy and individual's satisfaction.

The methods and systems disclosed herein provide several advantages. They allow for the personalization of cosmetic and personal care products based on an individual's specific skin and hair descriptions, preferences, and goals. The methods and systems also enable the continuous optimization of product formulation and recommendation based on customer's feedback. This results in an improved efficacy of the cosmetic routine for each specific individual, thereby addressing the limitations of both mass-produced and personalized cosmetic and personal care products currently available in the market.

Referring to FIG. 2, a diagram illustrates the process of generating 102 customer consolidated data. The process uses customer data 1. Customer data 1 includes a variety of information about the individual, such as skin and hair descriptions, stated preferences, stated goals or needs, and accuracy promoters. In some cases, the customer's data 1 may also include exposome data, which refers to environmental exposures encountered by the individual. This exposome data may be considered when generating the customer's scores, preferences, and needs.

In some embodiments, the customer's data 1 may also include a face picture and/or a scalp picture of the individual. The face picture and the scalp picture may be analyzed using a machine learning algorithm to determine skin metrics and/or hair metrics. These metrics may then be taken into account when generating the customer's scores, preferences, and needs.

The collected customer data 1 is input into the generating customer consolidated data process 102. This process utilizes a scoring matrix 20 to produce customer's scores, preferences, and needs 3. The scoring matrix 20 applies coefficients to the customer data 1 to calculate the customer's scores, preferences, and needs 3. The coefficients may be determined based on a variety of factors, such as the relative weight of different pieces of customer data 1. The resulting customer's scores, preferences, and needs 3 are then used in the formulation of custom cosmetic and personal care products.

In this way, the process of generating customer consolidated data 102 allows for the personalization/customization of cosmetic and personal care products based on an individual's self-declared skin and hair descriptions, preferences, and goals without suffering from inherent low reliability of such user's inputs. It results in an improved efficacy of the recommended cosmetic and personal care routine and products therein for each specific individual.

Referring to FIGS. 3A-B, a flowchart illustrates the process of formulating a cosmetic and personal care product. The process begins with the identification of accessible formulas 9 from components library 24. The components library 24 may include a variety of formula bases and actives that can be used in the formulation of cosmetic and personal care products. In some aspects, the accessible formulas 9 are identified based on formulation constraints 23. The formulation constraints 23 may include various factors such as stability and safety requirements of cosmetic and personal care products.

Once the accessible formulas 9 are identified, they are subjected to performance contribution scores to generate rated formulas 10. The rated formulas 10 represent for example, the accessible formulas performance indexes for each considered benefit.

The rated formulas 10 are then evaluated using benefit prioritization functions 4 to determine their performance levels desirability, also called performance prioritization rates. The benefit prioritization functions 4 are generated based on the customer's scores, preferences, and needs using benefits priority triggers, and are used to evaluate the desirability of each rated formula. For each formula, the level of performance for each benefit is evaluated then the desirability level for each benefit is evaluated and next, an average desirability, also called overall performance rate, is calculated for each formula and the optimal formula 11 is selected.

In some embodiments, the performance contribution scores 25 used to evaluate the performance of the formulas with regards to benefits are predetermined using a machine learning model. The machine learning model may be trained on performances that are instrumentally measured, performances evaluated via a sensory experts panel, or evaluations of cosmetic care products comprised in customer's feedback 13. This allows for a more accurate and reliable evaluation of the performance of the formulas, leading to a further improved selection of an optimal formula that maximizes the efficacy of the custom cosmetic and personal care product for each specific individual.

Figure 4:
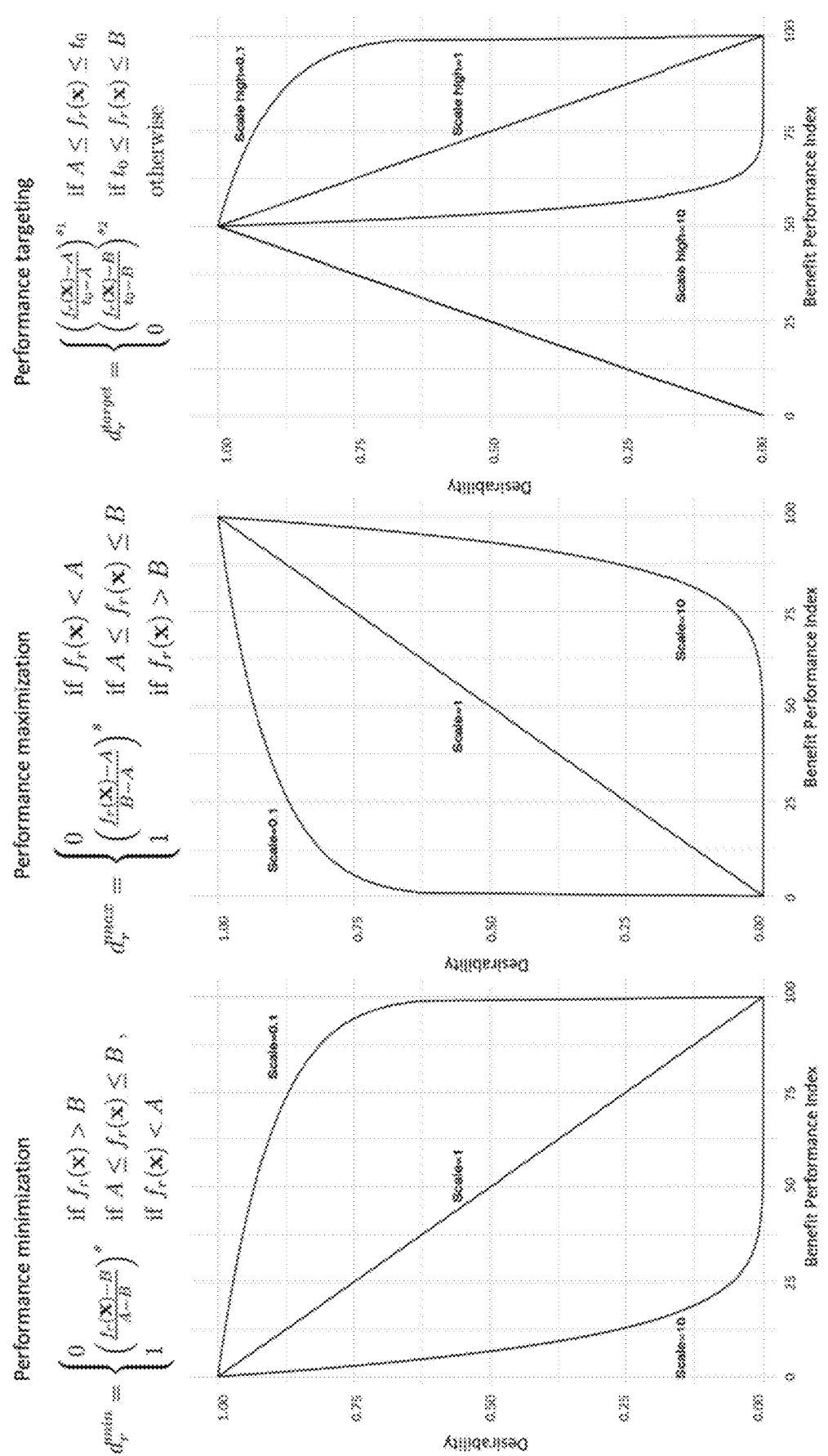
FIG. 4 shows a set of graphs representing different benefit prioritization functions and their impact on the desirability of a benefit performance index, according to aspects of the present disclosure.

Referring to FIG. 4, a set of graphs is depicted representing benefit prioritization functions 4. Each graph illustrates how different scaling factors affect the desirability of a performance. The graphs show three scenarios: performance maximization, performance minimization, and performance targeting, each with curves that demonstrate the impact of scaling on the desirability outcome. The benefit prioritization functions 4 are instrumental in determining the optimized formulation of cosmetic and personal care products by evaluating the optimal trade-offs between the various performances with regards to benefits.

In some aspects, the benefit prioritization functions 4 may be discontinuous functions of Derringer and Suich. These functions are particularly useful in situations where the desirability of a performance is not linearly related to the input values, but instead has a more complex relationship. For example, in the case of performance maximization, the desirability of a performance may increase rapidly for small increases in a performance value, but then level off or even decrease for larger performance values. This can be represented by a discontinuous function that has a steep slope for small input values and a flatter slope for larger input values.

For example, in the case of performance targeting, the desirability of a performance may be maximized for a specific target input value, with lower desirability for both lower and higher input values. This can be represented by a discontinuous function that has a peak at the target input value and decreases on either side of this peak.

In this way, the benefit prioritization functions 4 provide a flexible and powerful tool for optimizing the formulation of custom cosmetic and personal care products, allowing for a wide range of performance criteria to be considered and for complex trade-offs between these criteria to be evaluated and balanced.

Figure 5A:
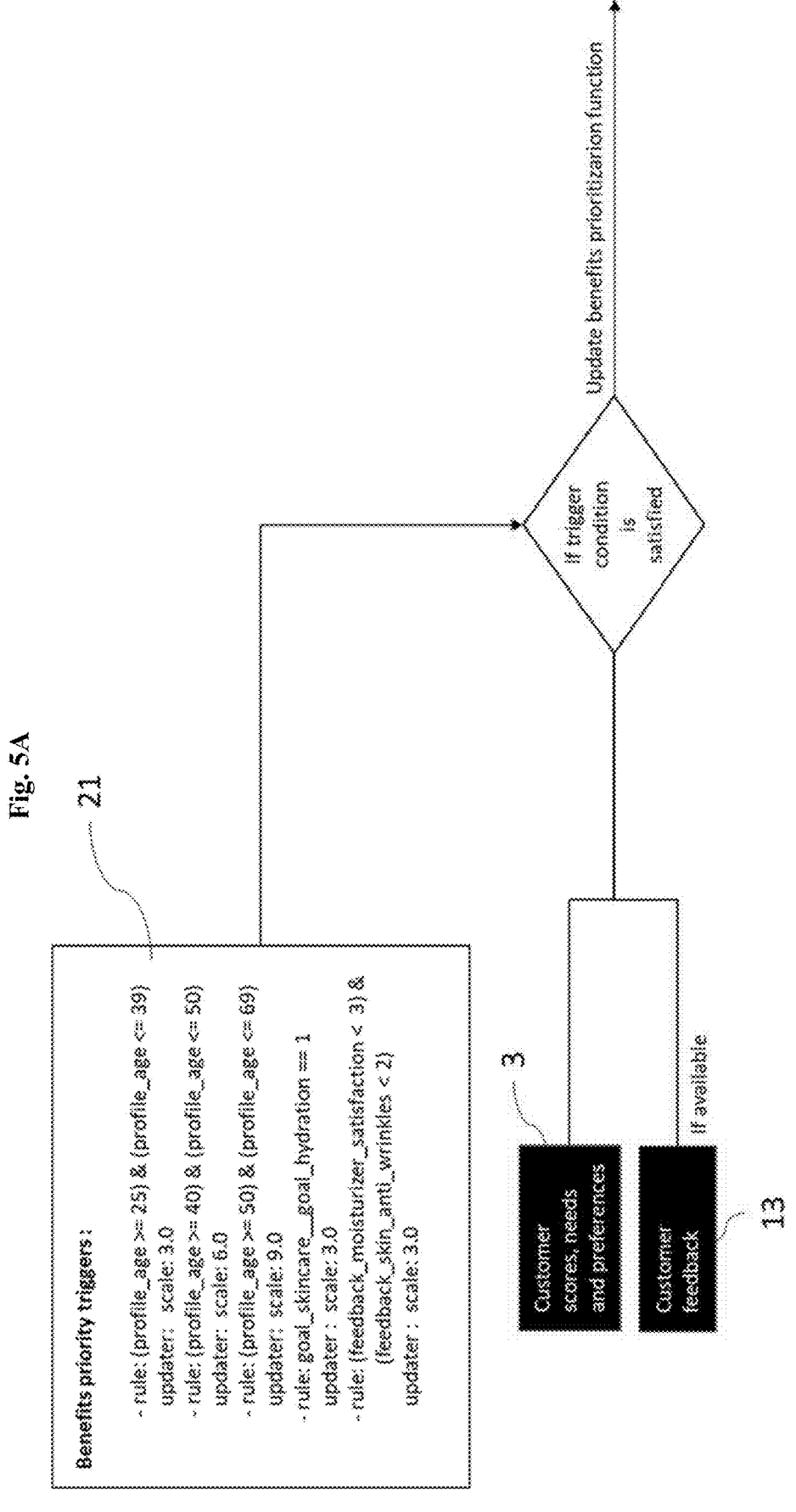
FIGS. 5A-B depict a flowchart illustrating the process of generating benefits prioritization functions based on customer consolidated data and feedback, according to aspects of the present disclosure.
Figure 5B:
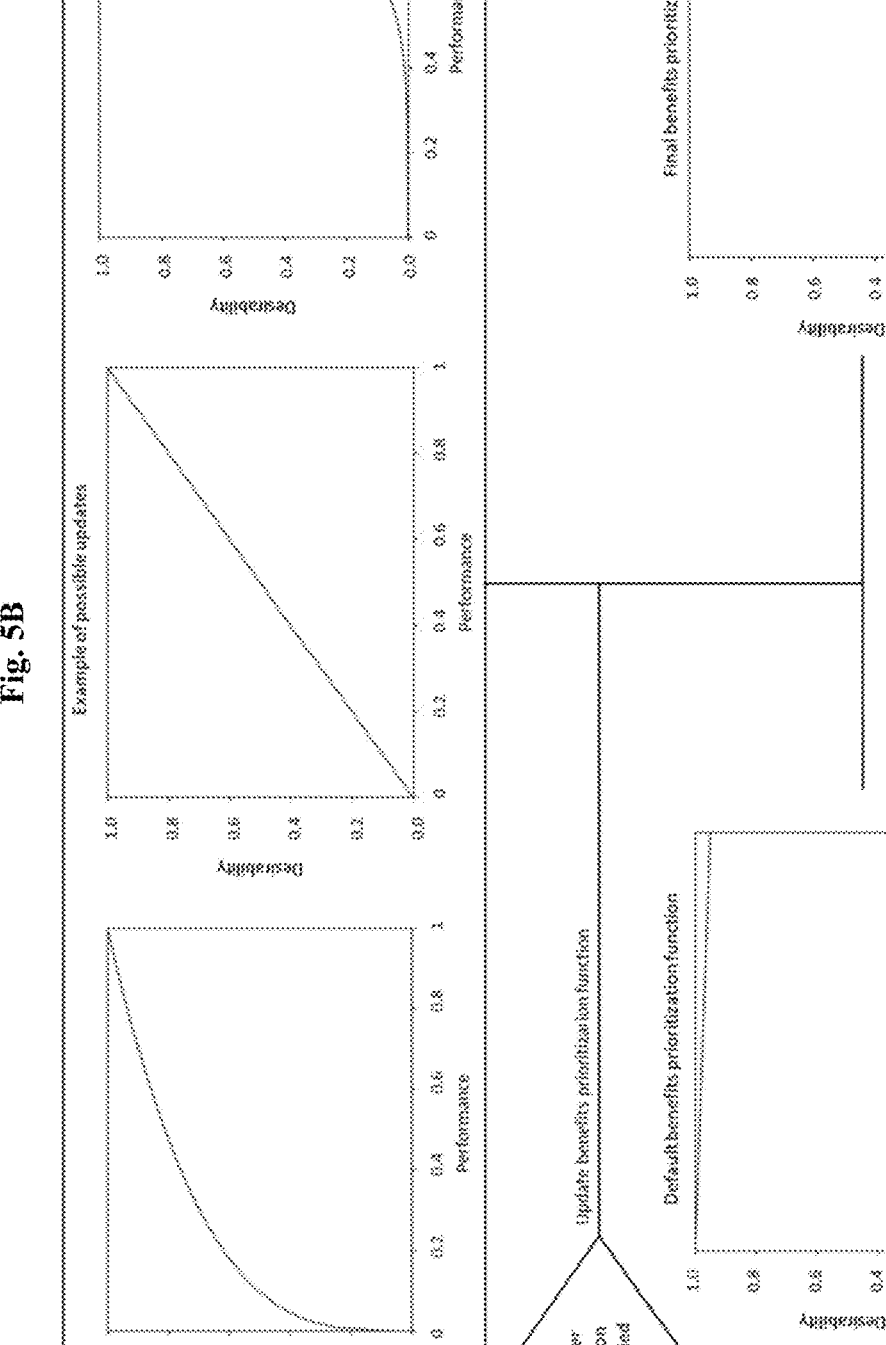

Referring to FIGS. 5A-B, a flowchart illustrates the process of generating benefit prioritization functions 4 based on customer's consolidated data and eventual customer's feedback. The process begins with the use of customer's scores, preferences, and needs 3. These customer's scores, preferences, and needs 3 are generated from customer's data collected during a consultation step, and include a variety of information about the individual, such as a skin and/or a hair description, stated preferences, stated needs, and accuracy promoters.

The process also involves the use of benefits priority triggers 21. These benefits priority triggers 21 use rules based on customer's consolidated data and eventual feedback to update the scaling of benefit prioritization functions 4. In some cases, the benefits priority triggers 21 may be based on specific conditions or thresholds related to the customer's scores, preferences, and needs 3. For example, a benefits priority trigger 21 may be activated if a customer's score for a particular skin or hair characteristic exceeds a predetermined threshold, indicating a high priority for addressing that characteristic in the formulation of the custom cosmetic and personal care product.

The customer's feedback 13 may also play a role in triggering the update of benefit prioritization functions 4. Customer feedback 13 includes evaluations of previously recommended routines and custom cosmetic and personal care products. The feedback 13 can provide valuable insights into the effectiveness of previous formulations and recommendations and can inform the update of benefit prioritization functions 4 to better align with the individual's current conditions and preferences.

The flowchart shows the transition from a default benefit prioritization function to a final benefit prioritization function after considering possible updates. This demonstrates how customer-specific data dynamically influences the formulation of custom cosmetic and personal care products. By continuously updating the benefit prioritization functions 4 based on customer data and feedback, the system can adapt to changes in the individual's conditions and preferences, and can continuously optimize the formulation and recommendation of custom cosmetic and personal care products to maximize their efficacy for each individual.

Figure 6:
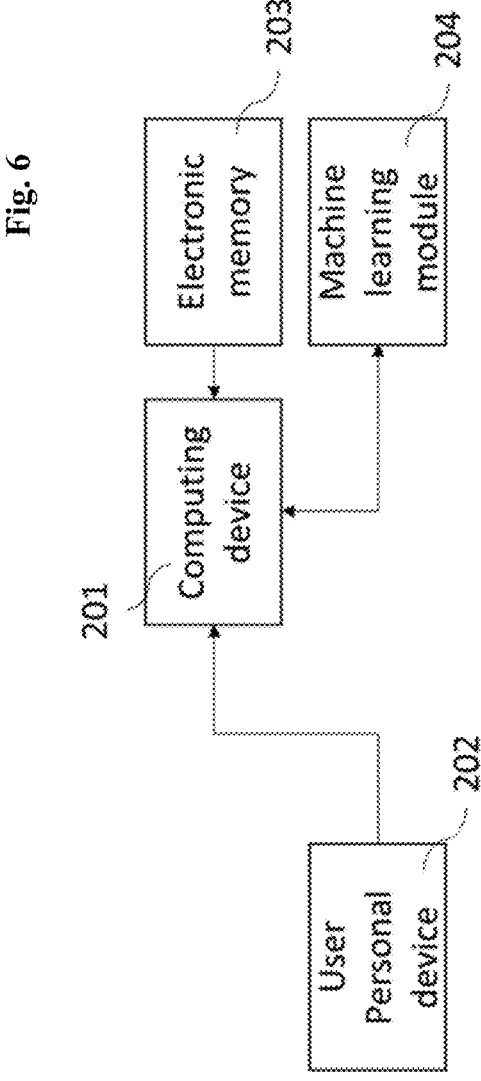
FIG. 6 presents a block diagram of a computing system for formulating custom cosmetic and personal care products according to aspects of the present disclosure.

Referring to FIG. 6, a block diagram illustrates a computing system for formulating custom cosmetic and personal care products. The computing system includes computing device 201, which serves as the central unit. In some aspects, the computing device 201 is connected to an individual's personal device 202, indicating a communication pathway between the user's interface and the computing system. This connection allows the individual's personal device 202 to collect customer's data 1 from the individual, such as skin and/or hair descriptions, stated preferences, stated goals, and accuracy promoters, and send this data to the computing device 201.

The computing device 201 is also connected to an electronic memory 203, signifying that the computing device 201 utilizes the electronic memory 203 for data storage and retrieval. The computing device 201 is configured to generate customer's consolidated data from the customer's data using a scoring function that can be a scoring matrix 20. This process results in the creation of customer's scores, preferences, and needs, which are then used in the formulation of custom cosmetic and personal care products.

Additionally, the machine learning module 204 is connected to the computing device 201. In some embodiments, the machine learning module 204 is configured to generate a performance machine learning model using performances that are instrumentally measured, performances evaluated via a sensory experts panel, or evaluations of custom cosmetic and personal care products comprised in customer's feedback 13. The performance machine learning model is configured to produce performance contribution scores 25, which are used to evaluate the performances of the formulas for the custom cosmetic and personal care products.

In some aspects, the computing device 201 is further configured to collect customer's feedback 13, generate second benefit prioritization functions 4 from the customer's scores, preferences, and needs, and select a second recommended routine using the customer's segment, and the evaluation of the first recommended routine. This process allows for the continuous optimization of cosmetic and personal care product formulation and recommendation based on customer's feedback, resulting in an improved efficacy of the cosmetic and personal care routine for each specific individual.

The computing device 201 is configured to identify accessible routines from the customer's segment using routines library 22, select a first recommended routine from accessible routines using the customer's scores, preferences, and needs, and for each first cosmetic and personal care product of the first recommended routine, identify accessible formulas using formulation constraints and a components library. The computing device 201 then generates benefit performance indexes of each accessible formula using performance contribution scores 25 and selects a first optimal formula from accessible formulas using first benefit prioritization functions and benefit performance indexes.

In some embodiments, the computing system may also include a 'Live Testing' feature, which involves A/B testing of different versions of benefits priority triggers. This feature, which may be implemented by the machine learning module 204, ensures that optimized benefits priority triggers have a proven superiority before deploying it to all individuals using the present disclosure systems and methods. This allows for a more accurate and reliable evaluation of the performance priority of the formulas, leading to the selection of an optimal formula that further maximizes the efficacy of the custom cosmetic and personal care product for each specific individual.

It is appreciated that each of the computing system, the computing device and the user personal device comprises a memory and one or more processors. Alternatively, each of the computing system, the computing device and the user personal device comprises one or more programmable logic circuits (FPGA, PLD, etc.) and/or one or more specialized integrated circuits (ASIC) and/or a set of discrete electronic components configured to implement all or part of the steps of the computerized method of formulating custom cosmetic and personal care products for an individual with regards to a benefits list. In accordance with an embodiment of the present invention, a computer program or instructions are stored in a non-transitory computer readable store medium, e.g., the electronic memory of the computing system and/or the computing device. The instructions when executed by the computing device configure the processor of the computing device to implement all or part of the steps of the computerized method of formulating custom cosmetic and personal care products for an individual with regards to a benefits list.

Several implementations have been described. Nevertheless, it will be understood that various modifications may be made without departing from the spirit and scope of the disclosure. Accordingly, other implementations are within the scope of the following claims.

The invention claimed is:

1. A computerized method of formulating custom cosmetic and personal care products for an individual with regards to a benefits list, using a processor-based computing system, the method comprising:

collecting from the individual, by the processor-based computing system, customer data comprising a) stated preferences, b) stated needs, c) accuracy promoters, and d) at least one of a skin description and a hair description;

generating, by the processor-based computing system, customer consolidated data from the customer data using a scoring function, the customer consolidated data comprise customer scores, needs and preferences, and a customer segment;

generating, by the processor-based computing system, for each benefit of the benefits list a first benefit prioritization function from the customer consolidated data using benefits priority triggers;

identifying, by the processor-based computing system, accessible routines from the customer segment using a routines library;

selecting, by the processor-based computing system, a first recommended routine from the accessible routines using the customer consolidated data, the first recommended routine comprising at least one first cosmetic and personal care product;

for each first cosmetic and personal care product of the first recommended routine:

identifying, by the processor-based computing system, accessible formulas from the customer consolidated data, using formulation constraints and a components library;

generating, by the processor-based computing system, for said each benefit of the benefits list a benefit performance index of each accessible formula using performance contribution scores;

selecting, by the processor-based computing system, a first optimal formula from the accessible formulas using first benefit prioritization functions and benefit performance indexes; and producing, a first custom cosmetic and personal care product according to the first optimal formula;

collecting from the individual, by the processor-based computing system, a customer feedback comprising an evaluation of the first recommended routine, and an evaluation of said each first cosmetic and personal care product;

generating, by the processor-based computing system, a second benefit prioritization function by modifying the first benefit prioritization function based on the customer feedback;

updating, by the processor-based computing system, the first recommended routine based on the customer feedback to provide a second recommended routine, the second recommended routine comprising at least one second cosmetic and personal care product;

for each second cosmetic care product of the second recommended routine:

selecting, by the processor-based computing system, a second optimal formula from the accessible formulas using the second benefit prioritization functions and the benefit performance indexes; and producing, a second custom cosmetic and personal care product according to the second optimal formula.

2. The method of claim 1, wherein the customer data further comprises exposome data and wherein the customer scores, needs and preferences take into account the exposome data.

3. The method of claim 1, wherein the customer data further comprises at least one of a face picture of the individual and a scalp picture of the individual; and the method further comprises determining, by the processor-based computing system using a machine learning algorithm, at least one of skin metrics and hair metrics from said at least one of the face picture and the scalp picture; and wherein the customer scores, needs and preferences take into account said at least one of skin metrics and hair metrics.

4. The method of claim 1, wherein the step of selecting the first recommended routine comprises validating or editing, by the individual, a core routine; and recommending, by a processor-based computing device, upsell products.

5. The method of claim 4, wherein the steps of updating, by the processor-based computing system, the first recommended routine to provide the second recommended routine comprise validating or editing, by the individual, a core routine; and recommending, by a processor-based computing device, upsell products.

6. The method of claim 1, wherein the performance contribution scores are predetermined using a machine learning model trained on performances measured instrumentally.

7. The method of claim 1, wherein the performance contribution scores are predetermined using a machine learning model trained on performances evaluated via a sensory experts panel.

8. The method of claim 1, wherein the performances contribution scores are predetermined using a machine learning model trained on evaluation of first custom cosmetic and personal care products comprised in the customer feedback.

9. A processor-based computing system to formulate custom cosmetic and personal care products for an individual with regards to a benefits list, the processor-based computing system comprising a processor-based computing device, when executing instructions stored in an electronic memory, configured to:

receive customer data from the individual comprising a) stated preferences, b) stated needs, c) accuracy promoters, and d) at least one of a skin description and a hair description;

generate customer consolidated data from the customer data using a scoring function, the customer consolidated data comprise customer scores, needs and preferences, and a customer segment;

generate, for each benefit of the benefits list, a first benefit prioritization function from the customer consolidated data using benefits priority triggers;

identify accessible routines from the customer segment using a routines library;

select a first recommended routine from the accessible routines using the customer consolidated data, the first recommended routine comprising at least one first cosmetic and personal care product;

for each first cosmetic and personal care product of the first recommended routine:

identify accessible formulas from the customer consolidated data, using formulation constraints and a components library;

generate, for said each benefit of the benefits list, a benefit performance index of each accessible formula using performance contribution scores; and select a first optimal formula from the accessible formulas using first benefit prioritization functions and benefit performance indexes;

collect a customer feedback from the individual, the customer feedback comprising an evaluation of the first recommended routine, and an evaluation of a plurality of first custom cosmetic and personal care products;

generate, for said each benefit of the benefits list, a second benefit prioritization function by modifying the first benefit prioritization function based on the customer feedback;

update the first recommended routine based on the customer feedback to provide a second recommended routine, the second recommended routine comprising at least one second cosmetic and personal care product; and for each second cosmetic and personal care product of the second recommended routine, select a second optimal formula from the accessible formulas using the second benefit prioritization functions and the benefit performance indexes.

10. The computing system of claim 9, further comprising a user personal processor-based device in communication with the processor-based computing device and wherein the user personal processor-based device is configured to collect the customer data from the individual and to send the customer data to the processor-based computing device.

11. The computing system of claim 10, further comprising a machine learning module configured to generate a performance machine learning model using at least one of the followings:

performances measured instrumentally;

performances evaluated via a sensory experts panel;

evaluation of said plurality first custom cosmetic and personal care products comprised in the customer feedback; and wherein the performance machine learning model is configured to produce the performance contribution scores.

12. The method of claim 1, wherein the first and second benefit prioritization functions are discontinuous functions of Derringer and Suich.

13. The computing system of claim 9, wherein the first and second benefit prioritization functions are discontinuous functions of Derringer and Suich.

* * * * *